(12) United States Patent
Kanzow et al.

(10) Patent No.: US 11,110,674 B2
(45) Date of Patent: Sep. 7, 2021

(54) METHOD FOR PRODUCING A COMPOSITE FABRIC MATERIAL AND DRIVE BELT COVERED WITH COMPOSITE FABRIC MATERIAL

(71) Applicant: ContiTech Antriebssysteme GmbH, Hannover (DE)

(72) Inventors: Henning Kanzow, Wedemark (DE); Claus-Lueder Mahnken, Ahausen (DE); Markus Obert, Hannover (DE); Michael Well, Vechelde (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 182 days.

(21) Appl. No.: 16/605,229

(22) PCT Filed: Feb. 5, 2018

(86) PCT No.: PCT/EP2018/052725
§ 371 (c)(1),
(2) Date: Oct. 15, 2019

(87) PCT Pub. No.: WO2018/197060
PCT Pub. Date: Nov. 1, 2018

(65) Prior Publication Data
US 2020/0122419 A1    Apr. 23, 2020

(30) Foreign Application Priority Data

Apr. 24, 2017  (DE) .................... 10 2017 206 844.2

(51) Int. Cl.
| | | |
|---|---|---|
| *B29C 43/28* | (2006.01) | |
| *B29C 43/48* | (2006.01) | |
| *B29C 43/52* | (2006.01) | |
| *B29D 29/08* | (2006.01) | |
| *B29L 29/00* | (2006.01) | |
| *B32B 27/12* | (2006.01) | |
| *B32B 37/10* | (2006.01) | |
| *F16G 1/28* | (2006.01) | |
| *B32B 5/02* | (2006.01) | |
| *B32B 5/04* | (2006.01) | |
| *B29K 7/00* | (2006.01) | |
| *B29K 21/00* | (2006.01) | |
| *B29K 105/08* | (2006.01) | |

(Continued)

(52) U.S. Cl.
CPC .............. *B29D 29/08* (2013.01); *B29C 43/28* (2013.01); *B29C 43/52* (2013.01); *B32B 5/02* (2013.01); *B32B 5/04* (2013.01); *B32B 27/12* (2013.01); *B32B 37/1036* (2013.01); *B29C 2043/486* (2013.01); *B29K 2007/00* (2013.01); *B29K 2021/00* (2013.01); *B29K 2105/0809* (2013.01); *B29K 2105/246* (2013.01); *B29L 2029/00* (2013.01); *B29L 2031/7094* (2013.01); *F16G 1/28* (2013.01)

(58) Field of Classification Search
CPC ......... B29C 43/22; B29C 43/24; B29C 43/28; B29C 43/48; B29C 43/52; B29C 2043/486; B29D 29/00; B29D 29/06; B29D 29/08; B29D 29/10; B29D 29/106; B29K 2007/00; B29K 2021/00; B29K 2021/006; B29K 2105/0809; B29K 2105/246; B29L 2029/00; B29L 2031/7094; B32B 5/02; B32B 5/024; B32B 5/04; B32B 25/10; B32B 27/12; B32B 37/1036; F16G 1/10; F16G 1/28; F16G 5/08; F16G 5/20
See application file for complete search history.

(56) References Cited

U.S. PATENT DOCUMENTS

| | | | | |
|---|---|---|---|---|
| 2,515,778 A | * | 7/1950 | Knowland ............. | B65G 15/32 156/182 |
| 3,041,661 A | * | 7/1962 | Elliott .................... | B29D 29/06 264/284 |
| 3,247,038 A | | 4/1966 | Kraft, Jr. | |

(Continued)

FOREIGN PATENT DOCUMENTS

| | | |
|---|---|---|
| CN | 102744955 A | 10/2012 |
| DE | 1931972 A | 1/1970 |

(Continued)

OTHER PUBLICATIONS

International Search Report dated May 14, 2018 of international application PCT/EP2018/052725 on which this application is based.

(Continued)

*Primary Examiner* — Michael A Tolin
(74) *Attorney, Agent, or Firm* — David L. Cate; Gregory Adams

(57) ABSTRACT

A method for producing a sheet-like composite fabric material, in particular a rubberized fabric or a fabric provided with a polymer preparation, for covering drive belts, the composite fabric material comprising a textile integrated in a matrix of elastomeric material, preferably at least one fabric layer integrated in a rubber matrix, the textile or the fabric layer and the elastomeric material being introduced into a gap between a band and a cylindrical molding wheel and molded to form a composite material between the band and the molding wheel at a temperature below the vulcanization temperature, the band looping around the molding wheel at a looping angle under pressure. Likewise disclosed is a drive belt with a covering of composite material produced according to the invention.

19 Claims, No Drawings

(51) Int. Cl.
   *B29K 105/24*  (2006.01)
   *B29L 31/00*  (2006.01)

(56) References Cited

U.S. PATENT DOCUMENTS

| | | | |
|---|---|---|---|
| 3,684,606 A | | 8/1972 | Grainger |
| 4,122,137 A | | 10/1978 | Bohm et al. |
| 4,269,585 A | * | 5/1981 | Gersbeck ................. B30B 5/04 425/373 |
| 2007/0232429 A1 | * | 10/2007 | Knox ....................... F16G 1/28 474/205 |

FOREIGN PATENT DOCUMENTS

| | | |
|---|---|---|
| DE | 2655025 C2 | 6/1977 |
| DE | 3149503 A1 | 6/1983 |
| DE | 3235740 A1 | 3/1984 |
| DE | 102013102148 A1 | 9/2014 |
| GB | 554252 A | 6/1943 |

OTHER PUBLICATIONS

"https://de.wikipedia.org/wiki/Vulkanisation" the offfice action dated Feb. 8, 2021 of correspondent DE application.

\* cited by examiner

METHOD FOR PRODUCING A COMPOSITE FABRIC MATERIAL AND DRIVE BELT COVERED WITH COMPOSITE FABRIC MATERIAL

The invention relates to a method for producing a sheet-like composite fabric material, in particular a rubberized fabric or a fabric provided with a polymer preparation, for covering drive belts, the composite fabric material comprising a textile integrated in a matrix of elastomeric material, preferably at least one fabric layer integrated in a rubber matrix. The invention likewise relates to a drive belt with a covering of a fabric composite material produced in such a way.

In composite materials, the matrix is the term usually used for referring to the material in which other constituents are embedded. "Rubberizing" is the technical term usually used for referring to the integration of textiles in rubber mixtures or polymer preparations. The term "covering" refers here to the application of composite fabric material to the surface of an article, for instance a drive belt, and the correspondingly suitable connection of the composite fabric material to the surface of the article. The term "mixture" is used here as a designation of any mixtures composed of or comprising rubber and/or other polymers.

Drive belts, that is to say for instance V-belts, multi V-belts or toothed belts, are often provided on their outsides with fabric layers, which significantly improve the conditions with respect to friction and wear between drive belts and drive belt pulleys during operation of the belts. Such fabrics are usually provided with various rubber or other polymer preparations to improve the adhesive bonding, protection from wear and impermeability to oil.

A wide variety of methods are used for producing these fabrics. One possibility for producing them is to immerse the fabric in a rubber solution/rubber mixture solution or bonding agent solution. For this, however, first the corresponding solution has to be prepared relatively laboriously and then considerable energy has to be expended for drying the fabrics. In addition, the amount that can be processed is limited by the amount of solution.

Relatively laborious waste gas cleaning is also required, since the solutions are provided with a solvent. In addition, the evaporation of the solvents leaves pores in the textile composite or in the composite material, so that there is the risk that the fabric is not completely filled. It is also not always ensured that all of the parts of the solvent evaporate out of the material forming the matrix and, for instance, that they do not remain in the matrix.

For process-related reasons, textiles with great longitudinal extensibility cannot be used for this. These are understood as meaning textiles that have over 50% elongation under tensile stress of 100 N, measured with a textile strip with a width of 5 cm. Textiles with great longitudinal extensibility, also known as longitudinally stretchable textiles, are produced for example by performing a texturing of the warp filaments, for instance by the false twist crimping method, or by using elastic filaments.

In addition, with the methods listed above there is only ever one material available in each operation as a matrix former for the fabric/the composite material.

Similar disadvantages occur both in the case of spreading, in which a polymer or rubber paste or a paste based on polymer or rubber mixtures is usually spread out, and in the case of calendering. Calendering is the term used for a process in which a roller is used for pressing a sheet of mixture or a mat of mixture into another sheet-like formation or for connecting it to the latter. In the case in question here, of producing composite fabric materials, this would be a sheet of mixture, which is integrated into the fabric layer by a roller. In the case of calendering, it may disadvantageously happen that the textile or the fabric layer is not filled well enough by placing the sheet of mixture on the surface, or that the depth of penetration of the mixture into the fabric layer is too little, depending of course on the viscosity of the mixture.

Another possibility is that of production by so-called "frictioning", in which a rubber or polymer mixture is heated by mechanical rolling, ultimately is hot-kneaded and driven into the textile by means of a roller. In this case, the amount applied is disadvantageously limited and only one material can also be applied in each operation. Here, too, it is possible that the matrix material is only driven into the uppermost textile layer, and therefore the filling is inadequate. Moreover, the textile or the fabric layer is of course subjected to great tensile forces, so that here too textiles with great longitudinal extensibility can scarcely be used.

The object of the invention is therefore to provide a method for producing a composite fabric material, in particular a fabric for covering drive belts, which does not have the disadvantages mentioned, ensures a pore-free and solvent-free matrix for the composite material, which allows a number of materials to be introduced in one operation, reduces solvent and simplifies the production process with respect to expenditure on equipment and personnel.

This object is achieved by the features of the main claim. Further advantageous configurations are disclosed in the dependent claims. Likewise disclosed is a drive belt with a covering of composite material produced according to the invention.

In the case of the method according to the invention, the textile or the fabric layer and the elastomeric material are introduced into a gap between a band and a cylindrical molding wheel and are molded to form a composite material between the band and the molding wheel at a temperature below the vulcanization temperature, the band looping around the molding wheel at a looping angle under such pressure that the elastomeric material penetrates into the textile or the fabric layer such that complete penetration is obtained and the yarns of the textile or of the fabric layer are completely integrated in the elastomeric material. The pressure that is advantageous here lies in a range from 2 to 6 bar.

Surprisingly, even a textile with great longitudinal extension (longitudinally stretchable textile) is connected by the method according to the invention to for example a rubber or polymer matrix such that the longitudinal extensibility is also substantially retained in the composite material, the textile being completely integrated in the matrix, i.e. filled with the matrix material. The looping angle around the molding wheel is adaptable according to the execution of the method and is usually over 180°.

The advantage of a sheet-like composite fabric material, for example a rubberized fabric layer, produced in such a way is that all of the yarns and tensile strands are protected by surrounding elastomeric material and are integrated in the matrix. Drive belts that are provided with such a fabric layer also have a particularly great adhesive bond between this fabric layer and the other material. For example in the case of toothed belts that run in operationally warm oil, the textile or the fabric layer is so well protected by the production method according to the invention that the running time and the lifetime in such aggressive conditions is increased significantly.

The method according to the invention can be realized particularly easily by reverting to existing, already known production devices, which can be adapted to the claimed method by simple changes in their production sequence. Advantageously, the textile or the fabric layer and the elastomeric material can thus be introduced between a band and a cylindrical molding wheel of a rotary vulcanizing device (AUMA) and molded there to form a composite material, the temperature control and bearing pressure of the band then of course being designed such that there is not quite any vulcanization, but complete penetration of the fabric nevertheless takes place.

Such rotary vulcanizing devices are disclosed for example in DE 1 931 972 A, DE 26 55 025 C2 and DE 10 2013 102 148 A1, although a rotary vulcanizing method in which extruded base material is used is described there. There, for producing an elastic traction means/drive belt blank, during the extrusion tension members run into the extruded, still warm and relatively viscous material in an outlet die. The still viscous material with the tension members thus produced is molded between a band and a cylindrical molding wheel while extracting heat to form the finished traction means and is vulcanized, the band looping under pressure around the molding wheel over a looping angle. As already stated above, when such an installation is used for the method according to the invention, the temperature control and the supply of elastomeric matrix material must be designed such that the composite material is not vulcanized. The band running on a molding wheel under pressure is important here, however, and can be used to obtain a reliable bond between the fabric or textile and the elastomeric material.

An advantageous development is that the elastomeric material is a polymer mixture, in particular a rubber mixture, preferably a solvent-free polymer mixture or rubber preparation/rubber mixture. Simply produced mixtures that do not contain any solvents may specifically be used for this. It is then possible to dispense with solvents, which are actually only required for the connecting process, i.e. only for reducing the viscosity to allow the elastomeric material to penetrate in and between the yarns of the fabric layer. This not only increases work safety, but is also extremely desirable for reasons of environmental protection.

A further advantageous configuration is that the elastomeric material is introduced between the band and the cylindrical molding wheel as a sheet, the sheet being introduced on one side or both sides of the textile or the fabric layer. Such sheets can be produced in any way desired as a preliminary material and be integrated very easily into the production process.

A further advantageous configuration is that a number of layers of elastomeric material or of textile or fabric are introduced between the band and the cylindrical molding wheel. This allows the composition and the thickness of the composite material to be adapted in an easy way to the further requirements of production and/or later operation.

A further advantageous configuration is that the temperature does not exceed 150° C., preferably does not exceed 100° C., during the molding process between the band and the molding wheel, which is very important in particular in the case of heat-sensitive components in the matrix. "Heat-sensitive" is the term used to refer to those components that already have a percentage cure of more than 10% at a process temperature of 100° C. The fact that the temperature between the band and the molding wheel remains below the stated limits during the production of the composite material means that the occurrence of noticeable vulcanization effects already during the production of the composite materials is reliably avoided.

The composite fabric material produced according to the invention is suitable in particular for drive belts, preferably toothed belts or else V-ribbed belts, that are covered on their rear side and/or their drive side with the composite fabric material produced according to the invention. As already explained above, in the case of such drive belts, which often run in operationally warm oil or in other harsh conditions, the textile or the fabric layer, and as a result also the belt covered with it, are well protected by the production method according to the invention such that the running time and the lifetime in such aggressive conditions are increased significantly.

Particularly suitable for covering drive belts is a textile or fabric layer which comprises a textile with over 50% elongation under a tensile stress of 100 N in the longitudinal direction of the covering, measured on a textile strip with a width of 5 cm. Even in cases of more complicated forms, as there are for example on toothed belts or else V-ribbed belts, a drive belt can thus be produced or covered well with a covering of a matrix-bound longitudinally stretchable textile, and consequently extensible composite material.

The invention claimed is:

1. A method for producing a composite fabric material, the composite fabric material comprising a textile integrated in a matrix of elastomeric material, the method comprising:
   introducing the textile and the elastomeric material into a gap between a band and a cylindrical molding wheel,
   molding the textile and the elastomeric material to form the composite fabric material between the band and the cylindrical molding wheel at a temperature below a vulcanization temperature of the elastomeric material,
   wherein the band is looped around the molding wheel at a looping angle under a pressure of from 2 to 6 bar, and wherein the textile has over 50% elongation under a tensile stress of 100 N in a longitudinal direction as measured on a textile strip with a width of 5 cm.

2. The method as claimed in claim 1, wherein the elastomeric material is a polymer mixture.

3. The method as claimed in claim 2, wherein the polymer mixture is a rubber mixture.

4. The method as claimed in claim 3, wherein the rubber mixture is solvent-free.

5. The method as claimed in claim 1, wherein the elastomeric material is introduced between the band and the cylindrical molding wheel as a sheet.

6. The method as claimed in claim 5, wherein the sheet is introduced on at least a side of the textile.

7. The method as claimed in claim 5, wherein the sheet is introduced on sides of the textile.

8. The method as claimed in claim 1, wherein a number of layers of the elastomeric material is introduced between the band and the cylindrical molding wheel.

9. The method as claimed in claim 1, wherein a number of layers of the textile is introduced between the band and the cylindrical molding wheel.

10. The method as claimed in claim 1, wherein a temperature during the molding between the band and the molding wheel does not exceed 150° C.

11. The method as claimed in claim 10, wherein the temperature during the molding between the band and the molding wheel does not exceed 100° C.

12. The method as claimed in claim 1, wherein the composite fabric material produced is configured to cover at least a side of a drive belt.

13. The method as claimed in claim 12, wherein the drive belt is a toothed belt.

14. The method as claimed in claim 12, wherein the composite fabric material is configured to cover a rear side of the drive belt.

15. The method as claimed in claim 12, wherein the composite fabric material is configured to cover a drive side of the drive belt.

16. The method as claimed in claim 12, wherein the composite fabric material is configured to cover a drive side and a rear side of the drive belt.

17. The method as claimed in claim 1, wherein the composite fabric material is a rubberized textile.

18. The method as claimed in claim 1, wherein the elastomeric material is a polymer preparation.

19. The method as claimed in claim 1, wherein the composite fabric material is at least one textile layer integrated in an elastomeric rubber matrix.

\* \* \* \* \*